United States Patent
Yang et al.

[11] Patent Number: 5,995,693
[45] Date of Patent: Nov. 30, 1999

[54] METHOD OF MAKING AN OPTICAL FIBER RIBBON WITH IMPROVED PLANARITY AND AN OPTICAL FIBER RIBBON WITH IMPROVED PLANARITY

[75] Inventors: Houching M. Yang, Conover; Steven X. Shen, Hickory, both of N.C.

[73] Assignee: Alcatel, Paris, France

[21] Appl. No.: 09/109,529

[22] Filed: Jul. 2, 1998

[51] Int. Cl.⁶ .................................................. G02B 6/44
[52] U.S. Cl. .................................................. 385/114
[58] Field of Search .................................. 385/114, 115, 385/147, 100; 264/1.27, 1.28; 427/163.2

[56] References Cited

U.S. PATENT DOCUMENTS

| | | |
|---|---|---|
| 4,096,010 | 6/1978 | Parham et al. . |
| 4,208,200 | 6/1980 | Claypoole et al. . |
| 4,479,984 | 10/1984 | Levy et al. . |
| 4,510,884 | 4/1985 | Rosebrooks . |
| 4,666,244 | 5/1987 | Van der Velde et al. . |
| 4,688,515 | 8/1987 | Rosebrooks . |
| 4,886,562 | 12/1989 | Pinson . |
| 4,900,126 | 2/1990 | Jackson et al. . |
| 4,984,859 | 1/1991 | Fujigaki et al. ................ 385/114 |
| 5,416,880 | 5/1995 | Edwards et al. . |
| 5,449,408 | 9/1995 | Koaizawa et al. . |
| 5,458,830 | 10/1995 | Shin et al. . |
| 5,483,611 | 1/1996 | Basavanhally . |
| 5,486,378 | 1/1996 | Oestreich et al. . |
| 5,627,930 | 5/1997 | Ishiguro et al. . |
| 5,682,454 | 10/1997 | Gaillard . |
| 5,904,883 | 5/1999 | Hattori et al. ................ 264/1.27 |

FOREIGN PATENT DOCUMENTS

| | | |
|---|---|---|
| 61-63810 | 4/1986 | Japan . |
| 63-208814 | 8/1988 | Japan . |
| 6-63483 | 3/1994 | Japan . |

*Primary Examiner*—Akm E. Ullah
*Attorney, Agent, or Firm*—Ware, Fressola, Van Der Sluys & Adolphson LLP

[57] ABSTRACT

A method of making an optical fiber ribbon with improved planarity and an optical fiber ribbon having improved planarity are described. The method includes the steps of providing a plurality of optical fibers and arranging the plurality of optical fibers to form a planar optical fiber arrangement. The planar optical fiber arrangement defines a first common tangent plane and a second common tangent plane. Matrix material is applied to the planar optical fiber arrangement to form a first uncured layer of matrix material such that the first layer does not extend beyond the first or the second common tangent plane by more than twenty micrometers. The first uncured layer of matrix material is then cured to achieve a degree of cure between 70% and 95% to provide a cured first layer of matrix material on the planar arrangement. Next, matrix material is applied over the first cured layer to form a second uncured layer of matrix material. Finally, the second uncured layer is cured until a degree of cure in the second layer is at least 85% to form an optical fiber ribbon with improved planarity. The optical fiber ribbon of the present invention can be made according to the method described.

13 Claims, 3 Drawing Sheets

METHOD OF MAKING AN OPTICAL FIBER RIBBON WITH IMPROVED PLANARITY AND AN OPTICAL FIBER RIBBON WITH IMPROVED PLANARITY

BACKGROUND OF THE INVENTION

1. Field of the Invention

The present invention relates generally to a method of making optical fiber ribbons. More particularly, the present invention relates to a method for making an optical fiber ribbon with improved planarity and to an optical fiber ribbon with improved planarity made according to the method.

2. Discussion of Related Art

In optical fiber ribbon, it is desirable to have the individual optical fibers aligned so that the longitudinal axes of the optical fibers are in the same geometric plane. Planarity is important during connection of two ribbon ends. If the two ends have the same planarity, the individual optical fiber ends will be aligned thereby making it easier to establish a connection which will efficiently transmit light.

Existing methods of manufacturing optical fiber ribbon include the use of three dies and two ultraviolet lights to form an optical fiber ribbon. Japanese Patent No. 63-208814 describes such a prior art method. In Japanese Patent No. 63-208814, a precoater applies a thin layer of ribbon matrix material to a plurality of optical fibers. Next, the optical fibers with the thin layer of ribbon matrix material are fed through a primary resin coater where additional matrix material is applied. After passing through the primary resin coater, the matrix material is exposed to ultraviolet light in order to cure the matrix material. Next, the optical fibers with cured matrix material thereon are fed through a secondary coater where additional matrix material is applied to achieve an uncured ribbon. Finally, the matrix material is cured by exposing the matrix material to ultraviolet light to produce an optical fiber ribbon. Using such a method has the disadvantage that the precoater, primary resin coater, and secondary coater must be maintained and checked periodically, resulting in a process which is often shut down for maintenance. In addition, inclusion of the precoater to apply the matrix material has been shown to adversely affect ribbon planarity because the precoater and primary resin coater are almost never properly aligned, thereby making planarity poor.

Another existing method of manufacturing optical fiber ribbon involves the use of a single die having a central opening which is smaller than the exit opening of the die. Japanese Pat. No. 6-63483 describes such a die. In Japanese Pat. No. 6-63483, the optical fibers enter the die through an entrance opening, move to a first coating chamber, through a central opening, to a second coating chamber, and exit the die through the exit opening. Such a die has the disadvantage that the optical fibers can move in the second coating chamber, the exit section and after leaving the die until the matrix material is set, for example through curing of the matrix material. As a result, it is very difficult to use such a die to produce an optical fiber ribbon in which the optical fibers are arranged in a plane.

SUMMARY OF THE INVENTION

Accordingly, it is an object of the present invention to provide a method which produces an optical fiber ribbon with improved planarity among the optical fibers. It is also an object of the present invention to provide an optical fiber ribbon with improved planarity among the optical fibers.

The foregoing objectives are realized by the method of the present invention which includes the steps of providing a plurality of optical fibers and arranging the plurality of optical fibers so that each optical fiber is juxtaposed to at least one other optical fiber and at most two other optical fibers to form a planar optical fiber arrangement. The planar optical fiber arrangement defines a first common tangent plane substantially commonly tangent to all of the optical fibers on a first side of the optical fibers. The planar optical fiber arrangement also defines a second common tangent plane substantially commonly tangent to all of the optical fibers on a second side of the optical fibers. After establishing the planar optical fiber arrangement, matrix material is applied to the planar optical fiber arrangement to form a first uncured layer of matrix material over the planar optical fiber arrangement, such that the first layer does not extend beyond the first or the second common tangent plane by more than twenty micrometers. Afterwards, the first uncured layer of matrix material is cured to achieve a degree of cure between 70% and 95% to provide a cured first layer of matrix material on the planar arrangement. Next, matrix material is applied over the first cured layer to form a second uncured layer. Finally, the second uncured layer of matrix material is cured until a degree of cure in the second layer is at least 85% to form an optical fiber ribbon with improved planarity.

Other objects and advantages of the present invention will become apparent to those skilled in the art from the following detailed description read in conjunction with the attached drawings and claims appended hereto.

BRIEF DESCRIPTION OF THE DRAWINGS

The drawings, not drawn to scale, include.

DETAILED DESCRIPTION OF THE INVENTION

Figure 1:
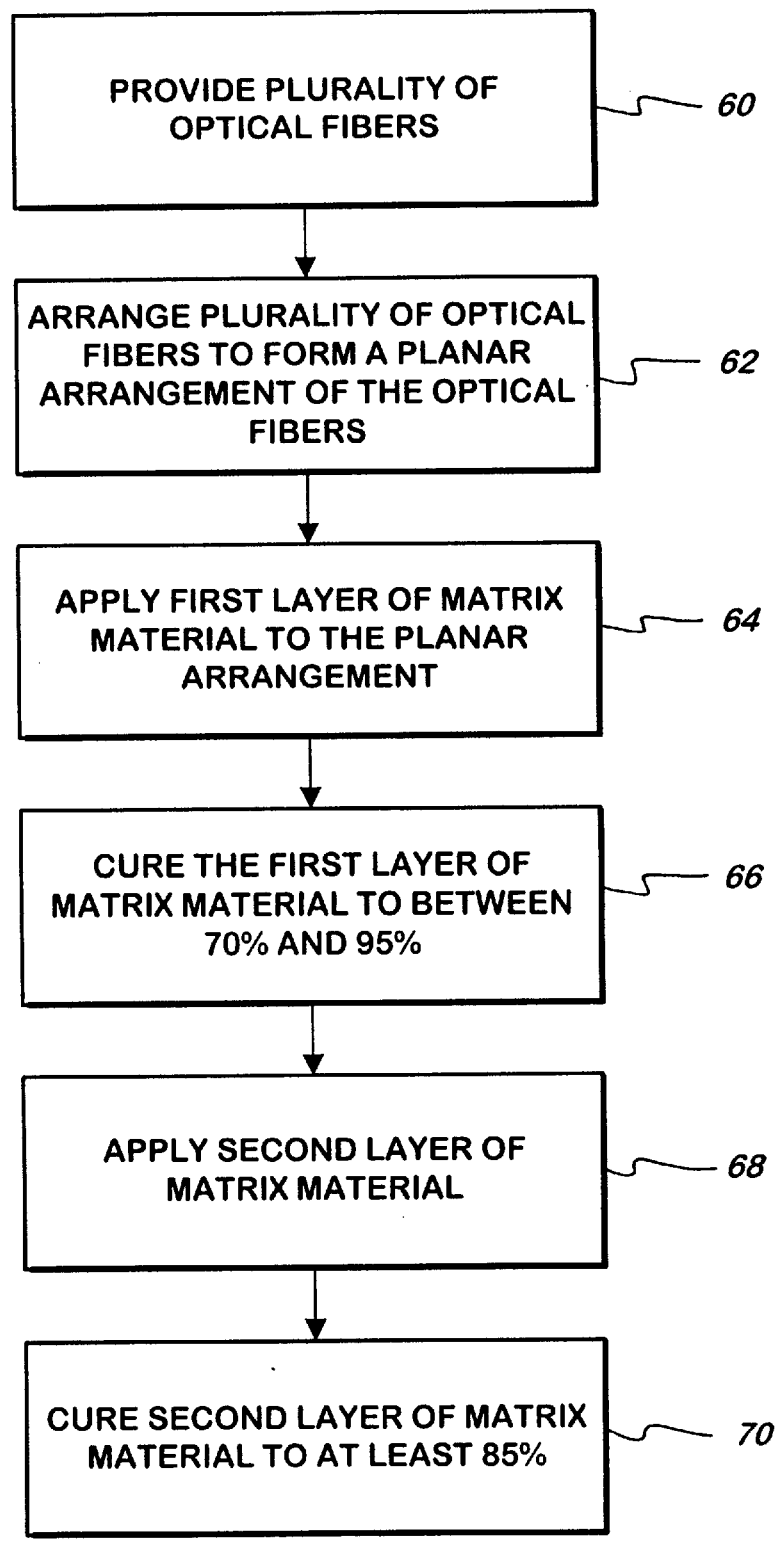
FIG. 1 is a flow diagram of the method according to the present invention.

FIG. 1 shows the primary steps 60, 62, 64, 66, 68 and 70 of the method of manufacturing an optical fiber ribbon with improved planarity according to the present invention. Generally, the method of the present invention includes the steps of providing a plurality of optical fibers 60, arranging the plurality of optical fibers to form a planar arrangement 62, applying a first layer of matrix material 64, curing the first layer of matrix material 66, applying a second layer of matrix material 68, and curing the second layer of matrix material 70.

Figure 2:
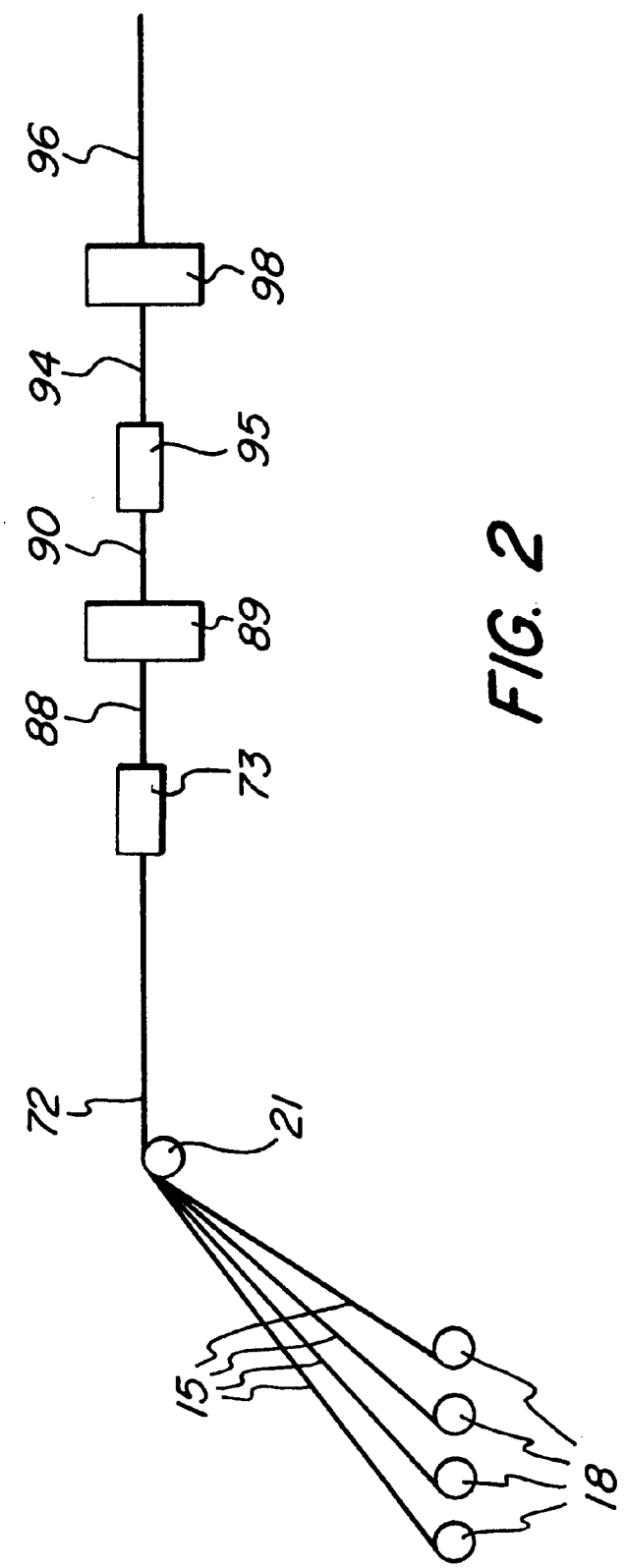
FIG. 2 is a schematic depiction of an apparatus for manufacturing an optical fiber ribbon having improved planarity according to the present invention.

FIG. 2 shows an apparatus for executing the method which includes spools 18 from which optical fibers 15 are continuously fed to a capstan or sheave 21 to form a planar optical fiber arrangement 72. The planar optical fiber arrangement 72 is fed through a first coating die 73 which applies a first layer of matrix material to the planar optical fiber arrangement 72 to form a primary coated planar optical fiber arrangement 88. Next, the first layer of matrix material is cured to a predetermined extent by, for example, an ultraviolet light 89 to form a primary cured planar arrangement 90. Next, a second layer of matrix material is applied by a second coating die 95 to form an externally uncured ribbon 94. Finally, the second layer of matrix material is cured to a predetermined extent by, for example an ultraviolet light 98 to form the optical fiber ribbon 96 according to the present invention.

Figure 3A:
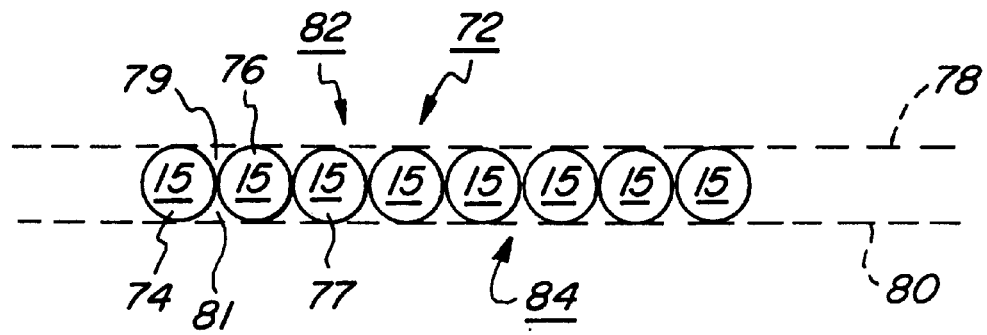
FIG. 3A is a cross-sectional end view of a planar optical fiber arrangement.

As shown in FIGS. 1 and 2, in the method a plurality of optical fibers 15 are provided 60 and arranged 62 in a planar optical fiber arrangement 72 so that each optical fiber 15 is juxtaposed to at least one other optical fiber 15, and at most two other optical fibers 15 to form a planar optical fiber arrangement 72. FIG. 3A shows a cross-sectional end view of the planar optical fiber arrangement 72, and shows an end optical fiber 74 having only one other optical fiber 76 juxtaposed to it. FIG. 3A also shows the other optical fiber 76 juxtaposed between the end optical fiber 74 and an inner optical fiber 77.

As shown in FIG. 3A, the planar arrangement 72 results in a first common tangent plane 78 and a second common tangent plane 80. The first common tangent plane 78 is substantially tangent to all of the optical fibers 15 on a first side 82 of the optical fibers 15, and the second common tangent plane 80 is substantially tangent to all of the optical fibers 15 on a second side 84 of the optical fibers 15.

Figure 3B:
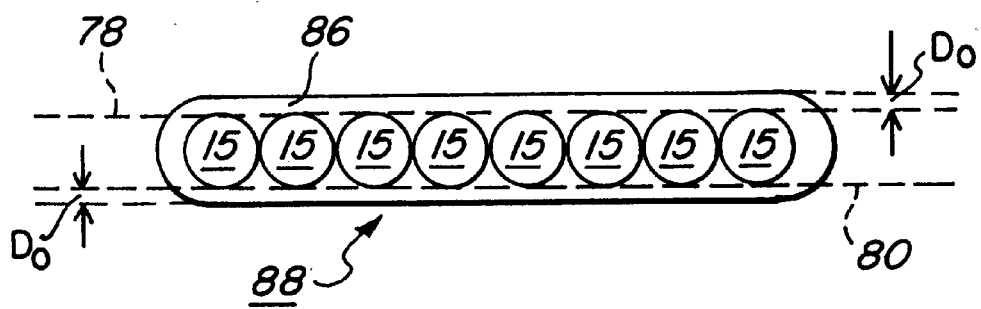
FIG. 3B is a cross-sectional end view of the planar optical fiber arrangement coated with a first layer of matrix material.

As shown in FIGS. 1 and 3B, once the planar optical fiber arrangement 72 is established, matrix material is applied 64 to the planar optical fiber arrangement 72 to form a first layer 86 of uncured matrix material on the planar optical fiber arrangement 72. The first layer 86 is applied such that it does not extend beyond the first common tangent plane 78 or the second common tangent plane 80 by more than a distance $D_o$. Distance $D_o$ is preferably not more than twenty microns, and is preferably not more than five microns. It should be noted that the first layer 86 may be applied such that it does not completely fill the interstitial space 79 between first tangent plane 78 and the fibers 15, or the interstitial space 81 between second tangent plane 80 and the fibers 15. The first layer of matrix material 86 can be applied to the planar optical fiber arrangement 72 by passing the planar optical fiber arrangement 72 through a first coating die 73 shown in FIG. 2.

As shown in FIG. 1, in the next step of the method according to the present invention, the first layer of matrix material 86 is cured 66 to achieve a degree of cure between 70% and 95% to provide a cured first layer on the planar arrangement 72. The degree of cure is determined using Fourier Transform Infrared (FTIR) Spectroscopy—Attenuated Total Reflectance (ATR) techniques described in an article at page 135 of the International Wire & Cable Symposium Proceedings 1991 authored by R. A Frantz, I. M. Plitz and S. R. Schmid. The degree of cure is important because if the degree of cure is below 70%, the first layer 86 will be damaged in subsequent steps of the method, and if the degree of cure is above 95%, further layers of matrix material will not bond properly with the first layer 86. The degree of cure is preferably between 70% and 90%. If the first layer 86 is comprised of an ultraviolet light curable material, the first layer 86 may be cured by exposing the first layer 86 to a first ultraviolet light source 89 shown in FIG. 2.

Figure 3C:
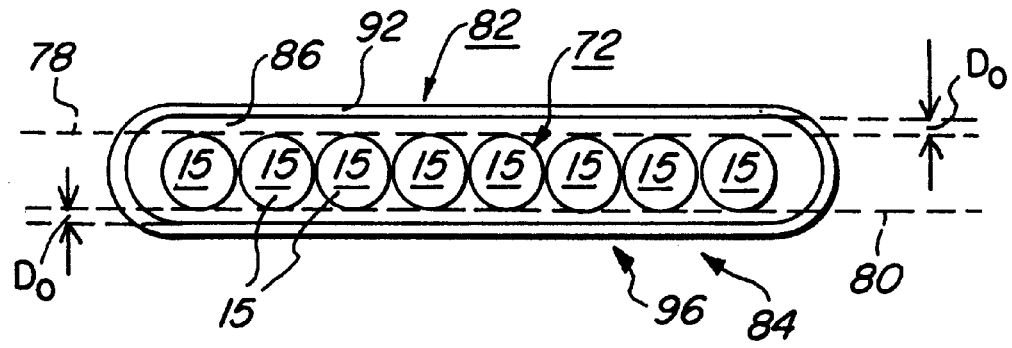
FIG. 3C is a cross-sectional end view of an optical fiber ribbon having improved planarity according to the present invention.

Once the first layer 86 is properly cured, as shown in FIG. 1, the matrix material is applied 68 over the first layer 86 to form a second layer 92 as shown in FIG. 3C. The second layer 92 may be formed from the same material as that used to form the first layer 86, or the second layer 92 may be formed from a different material from that used to form the first layer 86. In addition, one or both of the first and second layers may be comprised of an ultraviolet light curable material. A suitable material for the first and second layers is a polymer material of the polyurethane acrylate type described in U.S. Pat. No. 5,567,794. The second layer 92 can be applied by passing the primary cured planar arrangement 90 through a second coating die 95 shown in FIG. 2.

Finally, the second layer 92 is cured 70 until a degree of cure in the second layer 92 is at least 85%. The second layer 92 is preferably cured until the degree of cure in the second layer 92 is above about 90%. The degree of cure of the second layer 92 is important in order to ensure proper surface properties and reliability of the cured optical fiber ribbon 96 in a cable or other applications. If the second layer 92 is comprised of an ultraviolet light curable material, the second layer 92 may be cured by exposing the second layer 92 to a second ultraviolet light source 98 shown in FIG. 2.

The method of the present invention described above produces an optical fiber ribbon 96 with improved planarity among the optical fibers 15. Curing the first layer 86 before further acting on the primary coated planar optical fiber arrangement 88 fixes the optical fibers 15 in a plane before such further acts can diminish the planarity. In addition, by applying the first layer of matrix material to a thickness according to the present invention, the subsequent step of curing the first layer results in a primary cured planar arrangement 90 having a more uniformly cured first layer 86. A uniformly cured first layer 86 in the primary cured planar arrangement 90 will hold the planarity of the optical fibers 15 better than a first layer which contains regions of relatively uncured matrix material into which an optical fiber might move.

Although the present invention has been described with respect to one or more particular embodiments of the device, it will be understood that other embodiments of the present invention may be made without departing from the spirit and scope of the present invention. Hence, the present invention is deemed limited only by the appended claims and the reasonable interpretation thereof.

What is claimed is:

1. A method of manufacturing an optical fiber ribbon with improved planarity, the method comprising the steps of:

providing a plurality of optical fibers;

arranging the plurality of optical fibers so that each optical fiber is juxtaposed to at least one other optical fiber and at most two other optical fibers to form a planar optical fiber arrangement, the planar optical fiber arrangement defining a first common tangent plane substantially commonly tangent to all of the optical fibers on a first side of the planar optical fiber arrangement, and a second common tangent plane substantially commonly tangent to all of the optical fibers on a second side of the planar optical fiber arrangement;

applying matrix material to the planar optical fiber arrangement, to form a first uncured layer of matrix material on the planar optical fiber arrangement, wherein the first uncured layer is applied such that it does not extend beyond the first or the second common tangent plane by more than twenty microns;

curing the first uncured layer of matrix material to achieve a degree of cure between 70% and 95% to form a cured first layer of matrix material on the planar arrangement;

applying matrix material over the cured first layer on the planar optical fiber arrangement to form a second uncured layer of matrix material; and curing the second layer of matrix material until a degree of cure in the second layer is at least 85%.

2. A method according to claim 1 wherein the step of curing the first uncured layer of matrix material is performed by exposing the first uncured layer of matrix material to ultraviolet light.

3. A method according to claim 1 wherein the step of curing the second layer of matrix material is performed by exposing the second layer of matrix material to ultraviolet light.

4. A method according to claim 1 wherein the step of applying matrix material to the planar optical fiber arrangement is performed by passing the planar optical fiber arrangement through a coating die.

5. A method according to claim 1 wherein the step of applying matrix material to the planar optical fiber arrangement is carried out such that the first uncured layer does not extend beyond the first or the second common tangent plane by more than five microns.

6. A method according to claim 1 wherein the step of curing the first uncured layer is carried out to achieve a degree of cure between 70% and 90%.

7. A method according to claim 1 wherein the step of applying the matrix material over the cured first layer on the planar optical fiber arrangement is performed by passing the planar optical fiber arrangement through a coating die.

8. An optical fiber ribbon manufactured in accordance with the method of claim 1.

9. An optical fiber ribbon comprising:

a plurality of optical fibers arranged such that each optical fiber is juxtaposed to at least one other optical fiber and at most two other optical fibers to form a planar optical fiber arrangement, the planar optical fiber arrangement defining a first common tangent plane substantially commonly tangent to all of the optical fibers on a first side of the planar optical fiber arrangement, and a second common tangent plane substantially commonly tangent to all of the optical fibers on a second side of the planar optical fiber arrangement;

a first layer of matrix material having a degree of cure of at least 70% covering the planar optical fiber arrangement such that the first layer does not extend beyond the first or the second common tangent plane by more than twenty microns;

a second layer of matrix material having a degree of cure of at least 85% which covers the first layer of matrix material and the planar optical fiber arrangement.

10. An optical fiber ribbon according to claim 9 wherein the first layer of matrix material does not extend beyond the first or the second common tangent plane by more than five microns.

11. An optical fiber ribbon according to claim 9 wherein the second layer of matrix material is comprised of a material which is the same as that used for the first layer of matrix material.

12. An optical fiber ribbon according to claim 9 wherein the second layer of matrix material is comprised of a material different from that used for the first layer of matrix material.

13. An optical fiber ribbon according to claim 9 wherein the first layer of matrix material has a degree of cure of at least 70%.

* * * * *